Oct. 11, 1938.   W. TRAUTNER ET AL   2,133,000
VEHICLE SIGNALING SYSTEM
Filed Oct. 25, 1937
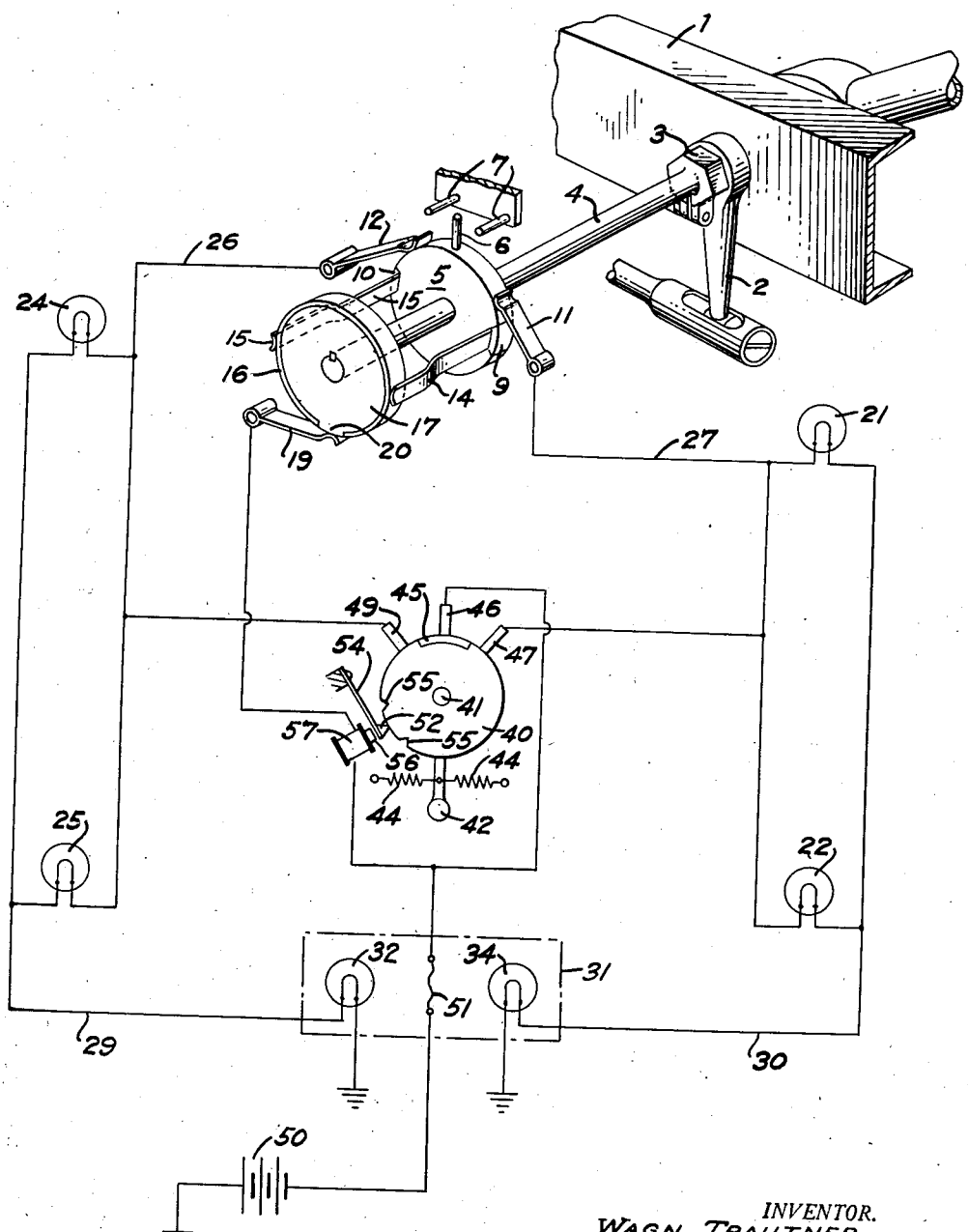
INVENTOR.
WAGN TRAUTNER
HERBERT E. METCALF
BY
Lippincott & Metcalf
ATTORNEYS.

Patented Oct. 11, 1938

2,133,000

UNITED STATES PATENT OFFICE 2,133,000

VEHICLE SIGNALING SYSTEM

Wagn Trautner, Springdale, Ohio, and Herbert E. Metcalf, Walnut Creek, Calif., assignors to E. H. Kueffer, Oakland, Calif.

Application October 25, 1937, Serial No. 170,828

3 Claims. (Cl. 177—339)

Our invention relates to a vehicle signaling system, and more particularly to such a system which may be completely monitored by the operator thereof at all times.

Among the objects of our invention are: To provide a vehicle signaling and monitoring system whereby the operator thereof is at all times aware of the condition of his signaling devices; to provide a vehicle signaling system having pilot indications in view of the operator; to provide a combination of automatic and hand switches for indicating the course of a vehicle; to provide a vehicle signaling system which may be hand set and automatically returned to neutral; to provide a means and method of vehicle signaling combining automatic indication and hand indication, together with supervisory indicators for showing the condition of the signaling indicators; to provide a means and method of indicating to an operator of a vehicle signaling system whether or not his signaling units are in operation; to provide a means and method of automatically centralizing a hand switch in a vehicle signaling system; to provide a circuit and switches therefor for indicating the course of a vehicle both automatically and by hand, together with means for indicating failure of any part of the system; to provide a vehicle signaling system utilizing both front and rear indicators, together with a means and method of monitoring failure of one of such units, even though the other of such units is still functioning; and to provide a vehicle signaling system that will indicate failure of the system at any point.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

The drawing is a diagrammatic view of a signaling system embodying our invention, the automatic switch being shown in expanded perspective in order that its operation may be more easily understood.

In a prior application of Clarence B. Howard entitled "Vehicle direction indicator", Serial No. 136,709, filed April 14, 1937, the inventor has disclosed and claimed a system for indicating both automatically and by hand any change in direction of a vehicle. The present invention is a modification and improvement on the circuit shown by Howard, in that it provides complete monitoring and will give to the operator thereof warning of any failure of the indicating devices or circuits, so that he need no longer rely upon the system and thus be liable to accident after a portion thereof has ceased functioning.

Our improved system allows the use of double indicators, one set on the front of a vehicle and the other set on the rear of the vehicle, and at the same time provides a check, warning the operator even if one of the indicators is not in operation. Thus, we have completely eliminated any chance of accident due to reliance upon a system which is at any point inoperative at the time, and furthermore, we utilize a hand switch which differs from and has advantages over that of Howard, in that it holds mechanically but is released to neutral position magnetically, whereas the Howard holding switch held magnetically and was released by de-energization of the holding coil.

Our invention will be described as utilizing a frictionally rotated switch mechanism which indicates automatically any change in direction of a vehicle from any instant course, irrespective of whether or not that course is a straight-away course. It will be apparent, however, that our invention can also be applied to an automatic switch which indicates purely a deviation from a straight-ahead course, and this will be discussed in conjunction with the description of the remainder of the circuit.

Inasmuch as our present invention includes, broadly, the same main elements of the Howard device described in the above-identified application, no further reference thereto will be made herein.

In one preferred form, our invention is illustrated diagrammatically in the drawing. Here, the frame 1 of a vehicle, such as an automobile or truck, or similar vehicle provided with a steering gear, as exemplified by the usual type of automobile steering gear 2, having a rotating axle 3, has attached as an extension to the rotating axle 3 a switch operating shaft 4. It is of course to be distinctly understood that this particular manner of attaching the switch to the steering gear is given purely as an example, inasmuch as any manner of rotating the shaft 4 in synchronism with the rotation of the steering gear will be satisfactory.

Frictionally mounted on shaft 4, which has been shown greatly elongated for clearness of illustration, is a switch disc 5. This disc is not keyed to shaft 4 in any manner and is free to rotate thereon, but is of such a tight fit that it will rotate with the shaft by friction until stopped, whereupon the shaft may continue to rotate in either direction. We prefer to utilize a disc projection 6, which as it rotates, comes in contact with spaced stop pins 7, so that only a small arc of rotation may be accomplished. Obviously, however, friction clutches of varying construction may be utilized to drive disc 5.

Mounted on the periphery of switch disc 5 are separated rotating contacts, one of them being right disc contact 9 and the other being left disc contact 10, and bearing against the periphery of disc 5 in the path of contacts 9 and 10 is a right brush 11 and a left brush 12. Brushes 11 and 12 are positioned on the periphery with relation to disc contacts 9 and 10, so that when the disc 5 is rotated to its maximum extent, as determined by stop arm 6 contacting one of stops 7 in one direction, electrical contact is made between disc contact 9 and brush 11 or disc contact 10 with brush 12, in accordance with the rotation of disc 5.

Extending from each disc contact 9 and 10 are rotating brushes 14 and 15 bearing on a slip ring 16 mounted on the periphery of rotating disc 17 directly keyed to shaft 4. If desired, rotating brushes 14 and 15 may be so designed as to increase the frictional rotational force applied from shaft 4 to cause disc 5 to rotate over its limited arc. A common brush 19 is positioned to bear on the periphery of disc 17, and the slip ring 16, over a given arc, is interrupted to provide a circuit breaking insulating segment 20 on the periphery of disc 17, this circuit breaking segment being positioned with respect to shaft 4 and steering gear 2 so that common brush 19 will not make contact to slip ring 16 when the vehicle being steered is pursuing a straight-ahead path. A sufficient arc is left on each side of this central position so that no contact will be made when minor movements of the steering gear, not sufficient to change the vehicle from a generally straight-ahead path, are being made. It will thus be seen that in the straight-ahead path, and over minor variations therefrom, no current can pass through the automatic switch attached to the steering gear, whatever the position of disc 5 may be, because common brush 19 will be on non-conducting segment 20.

While the switch just above described will, of course, operate with one signaling lamp connected on each side, we prefer to describe a circuit in which two signaling lamps indicating left and two signaling lamps indicating right are utilized. On the same side of the vehicle we prefer to place one of the signaling lights, 21, on the front of the vehicle, preferably on the right front, and the other light, 22, on the right rear of the vehicle. On the opposite side of the vehicle a left front signaling light 24 is used, and a left rear signaling light 25 is utilized, both of them connected in parallel, and those on the left connected to brush 12 through left connection 26, and those on the right connected to brush 11 through right connection 27. The opposite sides of the left hand lights 24 and 25 are connected together to form a left common wire 29, and the other sides of the right hand lights 21 and 22 are connected together to form a right common wire 30.

On the dash, or at any other point within convenient sight of the operator, we prefer to position a monitoring panel, as indicated by dotted line 31, and in the monitoring panel we may position, on one side, a left pilot lamp 32 connected on one side thereof to left common wire 29 and on the other side connected to ground, and on the right side of the panel we position a right pilot light 34 connected on one side to right common wire 30 and on the other side to ground. This completes the exterior lamp circuit. It is of course to be fully understood that we are utilizing lamps 21, 22, 24 and 25 purely to illustrate any signaling device operated by an electric current, inasmuch as anyone skilled in the art will fully understand that other mechanical devices, such as swinging arms, are the full equivalent.

Having fully described the automatic switch and its connected lamps, we wish to further include a means whereby the signaling lamps 21, 22, 24 and 25 may be operated selectively as to right or left by hand, in order that an indication may be set up prior to the actual turn being made, and in order to accomplish this purpose we utilize a hand switch comprising a hand switch disc 40 turned on a hand switch axle 41 by handle 42. Some means, such as opposed springs 44 attached to the handle 42, are utilized to maintain the switch in a central or neutral position.

A contact segment 45 is positioned on the periphery of disc 40, and three brushes are positioned around the periphery in such a manner that the central brush 46 always contacts segment 45, whereas right brush 47 contacts segment 45 only when the handle 42 is thrown to close a right circuit, and left brush 49 is contacted only when the handle 42 is thrown to connect a left circuit. Left brush 49 is connected to left connection 26, right brush 47 is connected to right connection 27, and the central brush 46 is connected to battery 50 through a fuse 51 positioned in monitoring panel 31. Thus, the hand switch will be seen to be in parallel, as far as the indicator lamps are concerned, with the automatic switch previously described as being connected to the steering gear.

In order that the hand switch remain in contact making position either right or left, we prefer to utilize a mechanical holding device which may be exemplified by a pawl 52 forced against the periphery of disc 40 by pawl spring 54, and then provide holding notches 55 into which pawl 52 may drop when handle 42 is moved to either right or left, thus holding the hand switch in contact making position. We prefer to make the pawl 52 of magnetic material, and position just above it a core 56 of magnetic material having wound thereon a release coil 57. This release coil is connected at one end thereof to source 50 through the fuse 51, and at the other end thereof to the common brush 19 on the automatic switch attached to the steering gear. It will be obvious, however, that there are many ways of mechanically holding switch 42 in contact making position, and that the notches 55 may be done away with and pawl 52 may be made a friction shoe bearing on the periphery, but in any case the operation should be the same, namely, that the hand switch will remain mechanically held in contact making position and will be released therefrom by removal of the holding force by the use of an electric current.

The operation of the device is simple. In order to light right lamps 21 and 22 manually, the handle 42 is thrown to the left, so that current from source 50 will pass through common brush 46, through right brush 47, through lamps 21 and 22, through pilot light 34, and thence to ground. Thus, lamps 21 and 22 on the right side of the vehicle will be illuminated, and the series pilot lamp 34 will also be illuminated. If the handle is thrown to the right, left lamps 24 and 25, and pilot lamp 32, will be illuminated.

The operator thus has in front of him at all times a pilot lamp indication of whether the signal lights on either side of the vehicle provide an electrical circuit. These signal lights, either right or left, may be illuminated at any time by the hand switch when the vehicle is proceeding in a straight-ahead position, and the hand switch will be held in contact making position because no current is passing through the automatic switch attached to the steering gear. However, when a turn is actually made, one or the other of the contacts 9 or 10 on the frictionally driven disc 5 of the automatic switch will contact its appropriate brush 11 or 12, and thus close an additional circuit through the signal lamp and pilot light on that side, and current will flow in a circuit parallel to the lamps through release coil 57, attracting the pawl 52 and allowing the handle 42 to centralize, due to springs 44 breaking the hand switch circuit and substituting the automatic switch circuit.

When any connection is made through the automatic switch, the hand switch will centralize, due to the fact that current will pass through release coil 57. The only time that the hand switch will not reset is when no current is passing through the automatic switch, due to the fact that brush 19 is on the non-conductive segment 20 of the rotating disc 17.

While the circuit just described will indicate whether or not the complete circuit to right or left is operative or inoperative, because all of the current therefrom passes through one or the other of pilot lights 32 or 34, it will be obvious that pilot lights 32 and 34 will still remain lit if only one of the signal lamps 21 and 22 or 24 and 25 on a side are still burning. If it should happen that the front or rear lamp on either side should burn out, the pilot light on that side would not go out, thus giving the driver a false pilot indication of the condition of his lamps, and leading him to rely on the circuit as being fully operative, and thus tending to accident.

We have found, however, that this condition may be readily made apparent to the operator of the hand switch by designing core 56 and release coil 57 so that the current through one signal lamp will not give a sufficient flux to release the handle, whereas current through both lamps on the same side will give enough flux so that quick release is obtained. Thus, the operator, if he finds that the handle will not return to central position on making any turn, immediately knows that one of his lamps on that particular side is not burning, even though his pilot lamp is. Burning out of fuse 51, of course, renders the entire system inoperative; both pilot lamps will go out, and the handle 42 will always remain in contact making position.

Therefore, by utilizing a hand switch with a magnetic release instead of a magnetic hold, we have provided a system which will indicate failure of any lamp or the complete circuit by failure of the handle to centralize, and thus we have provided for every contingency that might arise in indicator failure. The pilot lamps give an additional check.

Obviously, if more than two lamps on the side are desirable, the flux of the release magnet may be so regulated that the handle release will take place only when all of the lamps are operating. Fuse 51 may be easily regulated as to current carrying capacity so that a short in any lamp will open the fuse.

The system which we have above described is particularly desirable in a vehicle signaling system, because with such a system the operator once utilizing it tends to rely upon it. Thus, a complete monitoring of the system is vitally important, because if the operator does rely upon the system, and it is not operating as it should, an accident may easily result.

It should also be pointed out, as mentioned above, that with the magnetic release of the hand switch, as has been described herein, it is not necessary for the switch attached to the steering gear to be of the friction driven type, as illustrated, although the friction driven type has many advantages over a switch which merely makes contact to right and to left of the central position of the steering gear. The most simple type of switch of this latter type is one having a blade rotated with the steering gear, and which makes continuous contact when the steering gear is turned to right and left, irrespective of how far. Such a switch will operate perfectly with the hand switch and monitoring system herein described in place of the automatic switch that we have preferably utilized in our system. In that case the blade would be connected to power through the release coil 57. The lamps can be lit selectively when the steering gear arm was not making any contact, and when contact was made by the blade either to a right or left contact, the lights would be lit in parallel with the hand switch through the release coil 57, thus releasing the hand switch and leaving the one side lights illuminated until the steering gear returned to central position and the blade freed of electrical connection.

We therefore do not desire to be limited in our system to the use of the frictionally driven switch of Howard, although this latter switch has many advantages over the directly rotated switch, because the Howard switch indicates change of direction, whereas the direct-connected switch only indicates change from a straight-ahead course.

We also do not desire to be limited in any way to the use of the entire combination as shown, as it is obvious that the pilot lights, for example, are purely a double check, inasmuch as all checking of the circuits may be done by reference to the manner in which the handle of the manual switch behaves. For example, when the flux of the release magnet is such that it will release when both lamps are illuminated, but will not release when one only is illuminated, obviously any open circuit will prevent the handle from centralizing, whether that open circuit be in one lamp or both. Likewise, any short will blow the fuse, thus preventing any current flow whatsoever, and there again the handle will not centralize. Thus, the system monitors perfectly with two lamps on each side by the action of the handle alone.

When one lamp only is used for an indication on each side, the coil of the release magnet is of course wound to provide sufficient release flux with the current through one lamp, and under these conditions any failure of the single lamp will prevent release, and any short in the circuit will blow the fuse and thus also prevent release. The pilot lights, therefore, are simply an additional and double check on the operation of the system. However, it will readily be seen that the pilot lights allow the operator to follow the right and left indications during such times as the hand switch is not used for presetting the signal.

It will of course be obvious that in case it is desirable to run a single wire out from the switches to lamps 21, 22, 24 and 25, that leads from brushes 11 and 47 may be combined, and leads from brushes 12 and 49 may be combined, and the pilot lights 34 and 32 be placed in the combined lines respectively, so that the leads to the pilot lights may be made short for mounting on the dash, whereas the returns from the signal lamps may be directly grounded.

It will also be obvious to those skilled in the art that, for example, in case only one lamp on each side is to be utilized in series with the pilot light, that the two lamps on each side may be three volt lamps in a six volt circuit, thus giving full brilliancy in each. In the circuit as shown in the drawing, where two parallel six volt lamps are used, each pilot light 32 and 34 may be a six volt lamp when source 50 is six volts.

However, if it is desired to reduce the size of lamps 32 and 34, it will of course be obvious to all those skilled in the art that a resistor may be shunted across these lamps, such as, for example, a resistor with a one volt drop therein, with a one volt lamp bridged across the resistor.

In case a resistor is utilized in parallel with the pilot light, it will of course be obvious that a burn-out of the pilot light will not cause the signal lamps to be entirely extinguished, because only the amount of current carried by the pilot light itself would then be withdrawn from the signal lamps.

Other combinations of resistors parallel to the pilot lights will be immediately apparent to those skilled in the art, and shall be deemed full equivalents of the set-up as shown and described, and as claimed herein.

We claim:

1. A vehicle signaling system comprising a steering gear switch having a contact movable by action of said steering gear to automatically close right and left indicator circuits in accordance with motion of said steering gear, a power source supplying said indicator circuits through said steering gear switch, a plurality of parallel right and left indicators in their respective indicator circuits, a manual switch operable to selectively energize each of said indicator circuits from said source, resilient means for holding said manual switch in contact breaking position, mechanical means operating on said manual switch to hold said latter switch in contact making position against the urge of said resilient means, an armature on said mechanical means, an electromagnet positioned to move said armature when energized and connected to said source and to said steering gear switch, said mechanical means being connected to said armature so that movement of said armature will break the hold of said mechanical means on said manual switch, thereby allowing said switch to return to contact breaking position under the urge of said resilient means, said electromagnet being wound to provide sufficient flux to release said manual switch only when all of said indicators energized by said steering gear switch are passing current.

2. A vehicle signaling system comprising a steering gear switch having a contact movable by action of said steering gear to automatically close right and left indicator circuits in accordance with motion of said steering gear, a power source supplying said indicator circuits through said steering gear switch, a plurality of right and left indicators in their respective indicator circuits, and a manually operated switch comprising a contact disc rotatable at will of the operator to close said indicator circuits; resilient means operating on said disc to normally hold said disc in contact breaking position, mechanical holding means operating against said disc with a pressure sufficient to hold said disc in contact making position when rotated against said resilient means, an armature on said holding means, and an electromagnet connected to carry current passing through said steering gear switch and positioned to attract said armature when energized, the line of attraction being such as to reduce said pressure sufficiently to allow said disc to rotate back to circuit breaking position under urge of said resilient means, said electromagnet being wound to provide sufficient flux to release said manual switch only when all of said indicators energized by said steering gear switch are passing current.

3. In a vehicle signaling apparatus, electrically operated direction signals, electric circuits for effecting energization of a plurality of said signals to indicate a turn to the right or left, said circuits including manually operative make and break means comprising a movable member and means to hold the movable member in circuit closing positions, automatic means operating by turning of the vehicle steering gear away from a straight ahead position to energize the same circuits, and electromagnetic means operated by current passing through said automatic means and the energized signals for releasing said holding means, said electromagnetic means being wound to provide sufficient flux to release said holding means only when all of said energized signals are passing current.

WAGN TRAUTNER.
HERBERT E. METCALF.